United States Patent
Parker et al.

(10) Patent No.: US 10,122,472 B2
(45) Date of Patent: Nov. 6, 2018

(54) APPARATUS AND METHOD FOR RECOVERING DATA AT AN OPTICAL RECEIVER WITH AUTOMATIC TUNING

(71) Applicant: INPHI CORPORATION, Santa Clara, CA (US)

(72) Inventors: Kevin Parker, Nepean (CA); Lawrence Tse, Fremont, CA (US); Kenji Suzuki, Kanata (CA); Brian Wall, Stittsville (CA); Stephane Dallaire, Gatineau (CA); Florin Pera, Dunrobin (CA)

(73) Assignee: INPHI CORPORATION, Santa Clara, CA (US)

( * ) Notice: Subject to any disclaimer, the term of this patent is extended or adjusted under 35 U.S.C. 154(b) by 100 days.

(21) Appl. No.: 15/195,863

(22) Filed: Jun. 28, 2016

(65) Prior Publication Data
US 2017/0373761 A1 Dec. 28, 2017

(51) Int. Cl.
*H04B 10/66* (2013.01)
*H04L 25/03* (2006.01)

(52) U.S. Cl.
CPC ....... *H04B 10/66* (2013.01); *H04L 25/03006* (2013.01)

(58) Field of Classification Search
CPC ...... H04B 10/695; H04B 10/69; H04B 10/66; H04B 10/60; H04B 10/6911; H04L 25/03006
See application file for complete search history.

(56) References Cited

U.S. PATENT DOCUMENTS

| 2013/0071109 A1* | 3/2013 | Khatana | H04B 10/615 398/38 |
| 2014/0193164 A1* | 7/2014 | Ide | H04B 10/6933 398/210 |
| 2015/0311871 A1* | 10/2015 | Ide | H03F 1/3211 398/212 |
| 2015/0372648 A1* | 12/2015 | Sugimoto | H04B 10/272 330/2 |

OTHER PUBLICATIONS

Wikipedia, Transimpedance amplifier, downloaded on Apr. 5, 2016 from https://en.wikipedia.org/wiki/Transimpedance_amplifier, pp. 1-5.

\* cited by examiner

*Primary Examiner* — Ted Wang
(74) *Attorney, Agent, or Firm* — Richard T. Ogawa; Ogawa P.C.

(57) ABSTRACT

An optical receiver that recovers data is disclosed. The optical receiver includes a photodetector configured to convert an optical signal into a current signal, and a TIA (Transimpedance Amplifier) configured to operate according to a set of parameters to convert the current signal to a voltage signal. The optical receiver also includes an equalizer configured to process the voltage signal to produce a processed signal having recovered data from the optical signal, and to produce one or more equalization metrics. According to an embodiment of the disclosure, the optical receiver has a feedback processor configured to automatically tune operation of the TIA by adjusting at least one of the parameters of the TIA based on the one or more equalization metrics. This may effect a change in performance or power consumption of the optical receiver while receiving and recovering data. A corresponding method for recovering data is also disclosed.

14 Claims, 6 Drawing Sheets

APPARATUS AND METHOD FOR RECOVERING DATA AT AN OPTICAL RECEIVER WITH AUTOMATIC TUNING

FIELD OF THE DISCLOSURE

This application relates to communication systems, and more particularly to recovering data at an optical receiver.

BACKGROUND

Optical communication systems enable transmission of optical signals over an optical channel from an optical transmitter to an optical receiver. Optical channels are not ideal in the sense that they cause some amount of noise and/or distortion in the optical signals. The distortion can include linear distortion and/or non-linear distortion. Some optical receivers are equipped with circuitry to recover data received over the optical channel even though the optical signals include some amount of noise and/or distortion.

The amount of noise and/or distortion that is introduced by the optical channel can be a function of many factors. Various factors such as temperature and physical movement for example can affect the amount of noise and/or distortion that is introduced by the optical channel. While some factors could possibly be static, some factors may change from time to time. For example, the temperature of the optical channel could change as a function of its environment.

SUMMARY OF THE DISCLOSURE

An optical receiver that recovers data is provided. The optical receiver includes a photodetector configured to receive an optical signal over an optical channel and to convert the optical signal into a current signal, and a TIA (Transimpedance Amplifier) configured to operate according to a set of parameters to convert the current signal to a voltage signal. The optical receiver also includes an equalizer configured to process the voltage signal to produce a processed signal having recovered data from the optical signal, and to produce one or more equalization metrics.

According to an embodiment of the disclosure, the optical receiver has a feedback processor configured to automatically tune operation of the TIA by adjusting at least one of the parameters based on the one or more equalization metrics. In some implementations, the feedback processor effects changes in performance or power consumption of the optical receiver continuously in real-time while receiving and recovering data. For example, in some implementations, the performance of the optical receiver is adjusted according to changes in noise and/or distortion introduced by the optical channel, and power consumption is reduced when such reduction can be done without hampering performance.

A method for recovering data is also disclosed. The method is complementary to the optical receiver summarised above.

Other aspects and features of the present disclosure will become apparent, to those ordinarily skilled in the art, upon review of the following description of the various embodiments of the disclosure.

BRIEF DESCRIPTION OF THE DRAWINGS

Embodiments will now be described by way of example with reference to the attached drawings in which.

DETAILED DESCRIPTION OF EMBODIMENTS

It should be understood at the outset that although illustrative implementations of one or more embodiments of the present disclosure are provided below, the disclosed systems and/or methods may be implemented using any number of techniques. The disclosure should in no way be limited to the illustrative implementations, drawings, and techniques illustrated below, including the designs and implementations illustrated and described herein, but may be modified within the scope of the appended claims along with their full scope of equivalents.

Example Receiver

Figure 1:
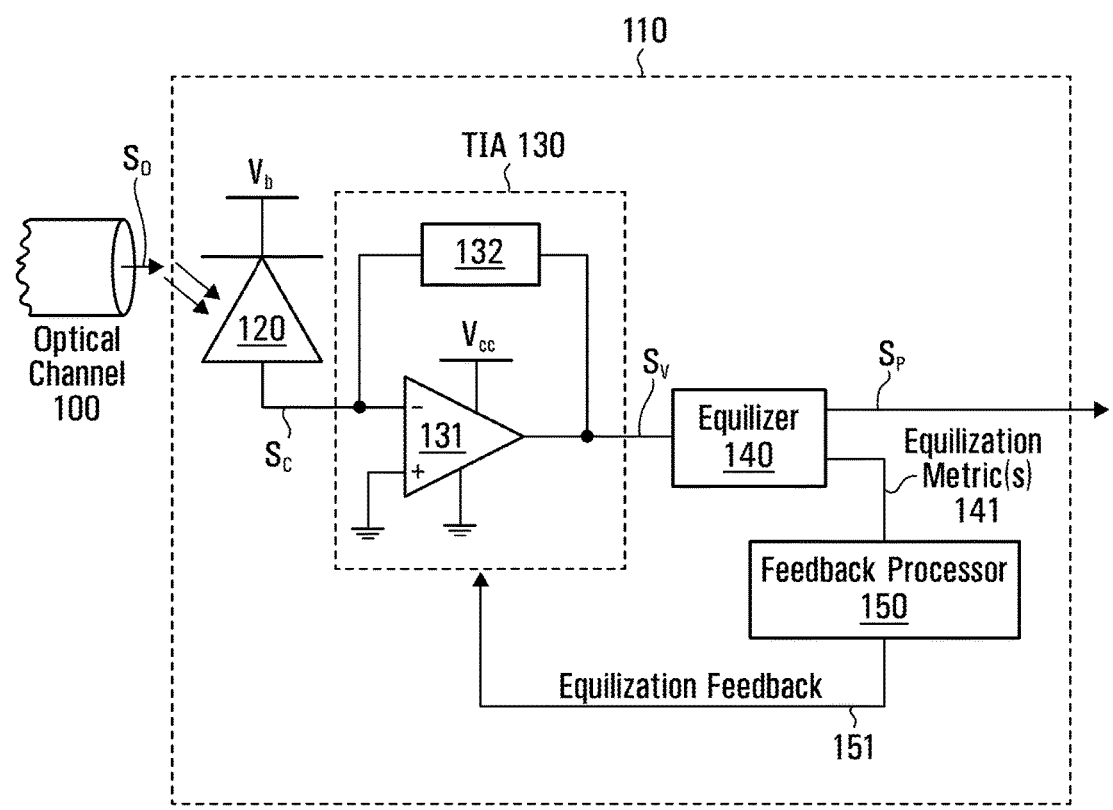
FIG. 1 is a block diagram of an example optical receiver for recovering data received over an optical channel.

Referring now to FIG. 1, shown is a block diagram of an example optical receiver 110 for recovering data received over an optical channel 100. The optical receiver 110 has a photodiode 120, a TIA 130, an equalizer 140, a feedback processor 150, and may have other components but they are not shown. The TIA 130 has an amplifier 131, an internal feedback circuit 132, and may have other components but they are not shown. In some implementations, the amplifier 131 has an active load (not shown) and/or a passive load (not shown).

Operation of the optical receiver 110 will now be described by way of example. An optical signal $S_O$ is received over the optical channel 100. The photodiode 120, which is in a reverse-biased configuration, converts the optical signal $S_O$ into a current signal $S_C$. The TIA 130 is configured to operate according to a set of parameters to convert the current signal $S_C$ into a voltage signal $S_V$. In some implementations, the set of parameters includes one or more of impedance of the internal feedback circuit 132, impedance of an active or passive load (not shown) of the amplifier 131, a target output voltage and/or a gain of the TIA 130, a power supply voltage $V_{CC}$ for the TIA 130, and a bias current for the TIA 130, but other parameters may be possible. The equalizer 140 is configured to process the voltage signal $S_V$ to produce a processed signal $S_P$ having recovered data from the optical signal.

The optical channel 100 is not ideal in the sense that it introduces some amount of noise and/or distortion in the optical signal $S_O$. The amount of noise and/or distortion that is introduced can be a function of many factors. Various factors such as temperature and physical movement for example can affect the amount of noise and/or distortion that is introduced by the optical channel 100. While some factors could possibly be static, some factors may change from time to time. For example, the temperature of the optical channel 100 could change as a function of its environment. Performance of the equalizer 140 in recovering the data can be affected by such changes.

The equalizer 140 is configured to produce one or more equalization metrics 141, which are indicative of performance of the equalizer 140 in recovering data or difficulty in recovering the data. According to an embodiment of the disclosure, the feedback processor 150 is configured to automatically tune operation of the TIA 130 by adjusting at least one of the parameters based on the one or more equalization metrics 141. In particular, as shown in the illustrated example, there is equalization feedback 151 to the TIA 130 for adjusting at least one of the parameters of the TIA 130. The operation of the TIA 130 is changed upon the parameters being changed, thereby affecting performance or power consumption of the optical receiver 110.

In some implementations, the feedback processor 150 effects changes in performance or power consumption of the optical receiver 110 continuously in real-time while receiving and recovering data. For example, the performance of the optical receiver 110 may be adjusted according to changes in noise and/or distortion introduced by the optical channel 100. In this manner, adjustments can be made to accommodate changing variables such as the temperature of the optical channel 100 for example. Additionally, or alternatively, power consumption may be adjusted continuously in real-time. For example, power consumption can be reduced when such reduction can be done without hampering performance. Also, even if the effects of the optical channel 100 are not changing, the one or more equalization metrics 141 can still change, and performance or power consumption of the optical receiver 110 can be adjusted accordingly. In some implementations, an equalization metric is monitored and the TIA 130 is tuned only when the equalization metric has changed by a predefined amount.

In alternative implementations, the feedback processor 150 effects a change in performance or power consumption of the optical receiver 110 only once, for example during a start-up calibration. In this manner, there is no need for the feedback processor 150 to effect changes in performance or power consumption of the optical receiver 110 continuously in real-time. Such alternative implementations, however, do not address variables that may subsequently change such as the temperature of the optical channel 100 for example.

In some implementations, the optical receiver 110 is part of an optical module (not shown) of a datacenter (not shown). Achieving acceptable performance while reducing power consumption has become important for many applications including datacenters, where dealing with heat generated by optical systems is a costly problem. Embodiments of the disclosure can tune the performance and the power consumption of the optical receiver 110 as appropriate. Other applications of the optical receiver 110 outside of datacenters are possible and are within the scope of this disclosure.

In some implementations, the extent by which the TIA 130 can be automatically tuned can be significant. For example, the optical receiver 110 could be used to receive data from the optical channel 100, and then switched over to receive data from a new optical channel (not shown) having different properties (e.g. channel length, channel quality, temperature, etc.), and the optical receiver 110 may be able to adjust the TIA 130 in a manner that accommodates data recovery from the new optical channel despite the different properties.

It is to be understood that the equalization feedback 151 is completely different from any internal feedback of the TIA 130 (e.g. the internal feedback circuit 132). In particular, the equalization feedback 151 is based on the one or more equalization metrics 141, which are produced downstream of the TIA 130 by the equalizer 140. This is not the same thing as internal feedback (e.g. the internal feedback circuit 132) that does not originate downstream by the equalizer 140.

Although the equalization feedback 151 is shown from the feedback processor 150 to the TIA 130, it is to be understood that there could be one or more intervening components (not shown). For example, in some implementations, the feedback processor 150 provides the equalization feedback 151 to a microcontroller (not shown), which in turn controls operation of the TIA 130 based on the equalization feedback 151. In some implementations, such control is performed digitally. Other implementations using analog control through an external DAC (Digital to Analog Converter) for example are possible.

In some implementations, a DSP (Digital Signal Processor) implements both the equalizer 140 and the feedback processor 150. In some implementations, the DSP implements a search algorithm to determine how to adjust at least one of the parameters of the TIA 130 to effect a change in performance or power consumption while recovering data. The search algorithm might for example be an LMS (Least Mean Squares) algorithm or a gradient-based algorithm, although other search algorithms are possible. In some implementations all of the component may be included on a single IC (integrated circuit). In other implementations, components such as the equalizer 140, the feedback processor 150 and the TIA 130 are all separate from one another (i.e. not implemented on the same IC). Although the disclosure focuses on digital implementations such as digital control by a DSP, it is to be understood that analog implementations are also possible by using an external DAC as noted above.

There are many possibilities for the one or more equalization metrics 141. The possibilities depend on the equalizer 140. Some equalizer chips have some combination of FFE (Feed Forward Equalizer) and DFE (Decision Feedback Equalizer) or other equalizer structure. Some equalizer chips may even have some type of eye, signal monitoring, or other equalization metrics. These equalization metrics may provide information about the optical channel 100.

In some implementations, the one or more equalization metrics 141 include one or more of an SNR (Signal to Noise Ratio) of the processed signal Sp, an indication of equalization strength for the equalizer 140 to recover data such as an FFE tap value for example, an indication of tail strength of the processed signal Sp, data framing information, DC-balance disparity information, a BER (Bit Error Rate) of the processed signal $S_P$, residual ISI (Intersymbol Interference) of the voltage signal $S_V$, and a THD (Total Harmonic Distortion) of the processed signal Sp. In other implementations, instead of considering metrics such as SNR or BER of the processed signal Sp, such metrics of the voltage signal $S_V$ are considered.

Embodiments of the disclosure take one or more of these equalization metrics into account when adjusting operation of the TIA 130. For example, in some implementations, the feedback processor 150 generates the equalization feedback 151 with a view to increase the SNR of the processed signal $S_P$ or to maintain a minimum acceptable level for the SNR. In some implementations, the feedback processor 150 sets out to reduce equalization by the FFE and/or DFE. In some implementations, the feedback processor 150 sets out to reduce a sum of high order taps in either the FFE and/or the DFE to reduce the tail of the processed signal $S_P$. In some implementations, the feedback processor 150 sets out to reduce a single high order tap in either the FFE and/or the DFE to reduce the tail of the processed signal $S_P$. In some implementations, the feedback processor 150 sets out to control certain taps in the FFE and/or the DFE to be in a specific range. In some implementations, the feedback processor 150 sets out to reduce one or more residual ISI terms, where residual ISI corresponds to the ISI seen prior to DSP equalization, namely in the voltage signal $S_V$.

Specific examples of how one or more equalization metrics can be taken into account when adjusting operation of the TIA 130 are described below under separate headings.

Adjusting Frequency Response

TIAs generally do not have flat frequency response, especially at high data rates. In particular, TIAs typically have a peaking at high frequencies. However, such peaking can help to offset attenuation by the optical channel at high frequencies. There is a design trade-off between bandwidth and peaking for the TIA. Some embodiments of the disclosure tune the bandwidth and the peaking as appropriate so that the overall frequency response of the channel and the TIA is generally flat.

In some implementations, the feedback processor 150 is configured for adjusting at least one of the parameters of the TIA 130 to change a frequency response of the TIA 130 (e.g. to change the bandwidth and/or the peaking of the voltage signal $S_V$). In some implementations, to accomplish this change, the feedback processor 150 adjusts impedance of the internal feedback circuit 132 of the TIA 130. This adjustment can be made based on any one or more of the equalization metrics listed above except for the DC-balance disparity information, which would not be relevant in adjusting the frequency response of the TIA 130.

Figure 2A:
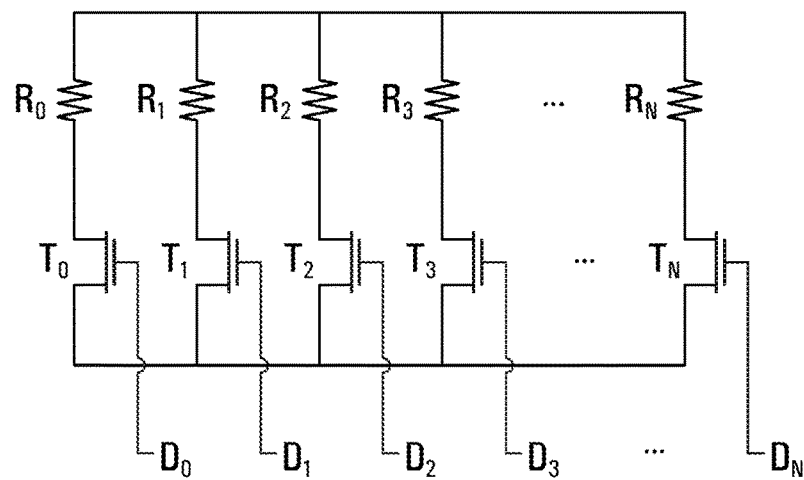
FIGS. 2A and 2B are circuit diagrams of example variable components that may be digitally adjusted.
Figure 2B:
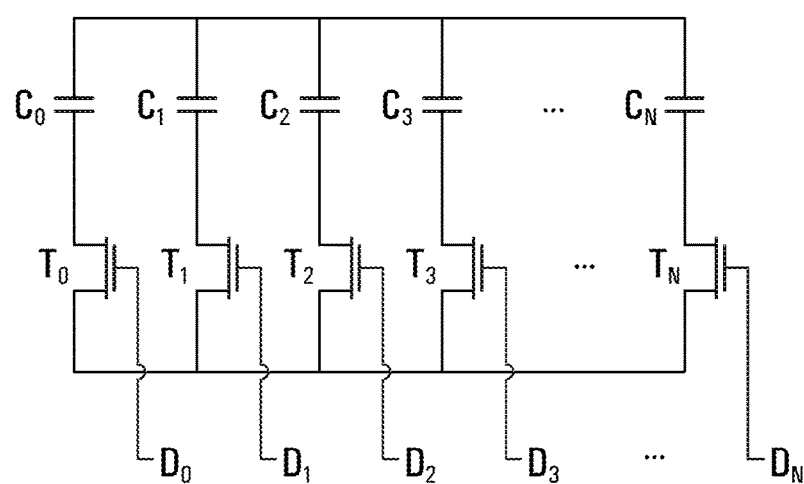

In some implementations, the impedance of the internal feedback circuit 132 is adjusted digitally. With reference to FIGS. 2A and 2B, shown are circuit diagrams of example variable components 200,201 that may be digitally adjusted. In some implementations, one or both of these variable components 200,201 is/are present in the internal feedback circuit 132 and is/are digitally adjusted via the equalisation feedback 151 from the feedback processor 150. Details of the variable components 200,201 are provided below.

According to FIG. 2A, a variable resistor 200 has multiple resistive elements $R_0, R_1, R_2, R_3, \ldots, R_N$ in parallel, and they are individually enabled or disabled by transistors $T_0, T_1, T_2, T_3, \ldots, T_N$ according to digital signals $D_0, D_1, D_2, D_3, \ldots, D_N$ of the equalisation feedback 151. The resistance of the variable resistor 200 is lowest when all of the resistive elements $R_0, R_1, R_2, R_3, \ldots, R_N$ are enabled. In some implementations, the resistive elements $R_0, R_1, R_2, R_3, \ldots, R_N$ are all identical to one another. In other implementations, the resistive elements $R_0, R_1, R_2, R_3, \ldots, R_N$ have different resistivity.

According to FIG. 2B, a variable capacitor 201 has multiple capacitive elements $C_0, C_1, C_2, C_3, \ldots, C_N$ in parallel, and they are individually enabled or disabled by transistors $T_0, T_1, T_2, T_3, \ldots, T_N$ according to digital signals $D_0, D_1, D_2, D_3, \ldots, D_N$ of the equalisation feedback 151. The capacitance of the variable capacitor 201 is highest when all of the capacitive elements $C_0, C_1, C_2, C_3, \ldots, C_N$ are enabled. In some implementations, the capacitive elements $C_0, C_1, C_2, C_3, \ldots, C_N$ are all identical to one another. In other implementations, the capacitive elements $C_0, C_1, C_2, C_3, \ldots, C_N$ have different capacity.

Although FIGS. 2A and 2B show the resistive elements $R_0, R_1, R_2, R_3, \ldots, R_N$ and the capacitive elements $C_0, C_1, C_2, C_3, \ldots, C_N$ separately, it is noted that other implementations are possible in which a combination of resistive elements and capacitive elements are present. The resistive elements and the capacitive elements can be in series and/or in parallel configurations. Also, while FIGS. 2A and 2B focus on adjusting resistance and capacitance, more generally, impedance can be adjusted. In general, the impedance of a component can be adjusted by adjusting a resistance and/or a reactance such as a capacitance or an inductance.

Figure 3:
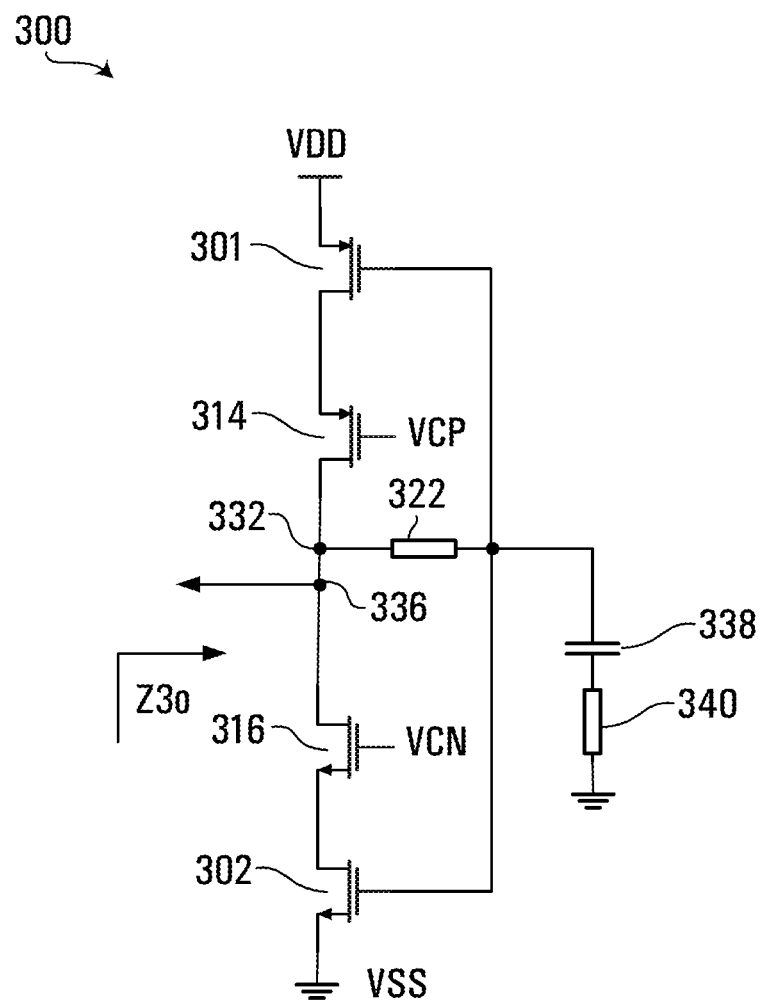
FIG. 3 is a circuit diagram of an example active load with variable components.

It is to be understood that adjusting the impedance of the internal feedback circuit 132 of the TIA 130 is only one of many possible ways to change the frequency response of the TIA 130. In some implementations, the amplifier 131 of the TIA 130 includes components that can be adjusted to change the frequency response of the TIA 130. For example, in some implementations, the amplifier 131 includes an active or passive load circuit at its output that can be adjusted. With reference to FIG. 3, shown is a circuit diagram of an example active load circuit 300 with variable components that can be adjusted. In some implementations, the active load circuit 300 is present in the amplifier 131 and is digitally adjusted via the equalisation feedback 151 from the feedback processor 150. Details of the active load circuit 300 are provided below.

The active load circuit 300 includes a dual split cascode CMOS (Complementary Metal Oxide Semiconductor) inverter with an AC (Alternating Current) coupled impedance. The active load circuit 300 has MOSFETs (Metal Oxide Semiconductor Field Effect Transistors) 301,302 that are respectively coupled to voltage supply rails VDD,VSS and have their gate terminals coupled to a load. The load is an AC coupled load that includes a capacitor 338 and a component 340 of a complex impedance. A cascode circuit path is coupled between the MOSFETs 301,302 and includes a pair of MOSFETs 314,316. A feedback path including an internal feedback circuit 322 is coupled between the load and a feedback point 332 between the MOSFETs 314, 316 of the cascode circuit path. A load point 336 between the pair of controllable switches of the cascode circuit path could be coupled to an output of TIA stage, for example. Output impedance of the active load circuit 300 is shown as $Z3o$.

The output AC impedance $Z3o$ of the active load circuit 300 is a function of the impedances of the internal feedback circuit 322, the component 340, and the gain of the active (amplifier) stage MOSFETs 301/314/316/302. In operation, any of these three main components or mechanisms can be varied in order to control the output impedance $Z3o$, which in turn has an effect on the frequency response of the TIA 130. In some implementations, the internal feedback circuit 322, the capacitor 338 and/or the component 340 are varied digitally by the equalisation feedback 151 as similarly described for the components 200,201 of FIGS. 2A and 2B.

Further details of active loads are provided in U.S. application Ser. No. 15/073,735, which is hereby incorporated by reference in its entirety.

Adjusting Amplitude

In some implementations, the feedback processor 150 is configured for adjusting at least one of the parameters of the TIA 130 to change an amplitude of the voltage signal $S_V$. For example, the amplitude of the voltage signal $S_V$ can be adjusted to a level that is low but still sufficiently high enough to robustly receive and recover data from the TIA 130. In some implementations, to accomplish this adjustment, the feedback processor 150 adjusts a target output voltage of the TIA 130 and/or a gain of the TIA 130. In some implementations, this adjustment is made based on an SNR of the processed signal $S_P$ and/or a BER of the processed signal $S_P$, although other equalization metrics are possible.

Figure 4:
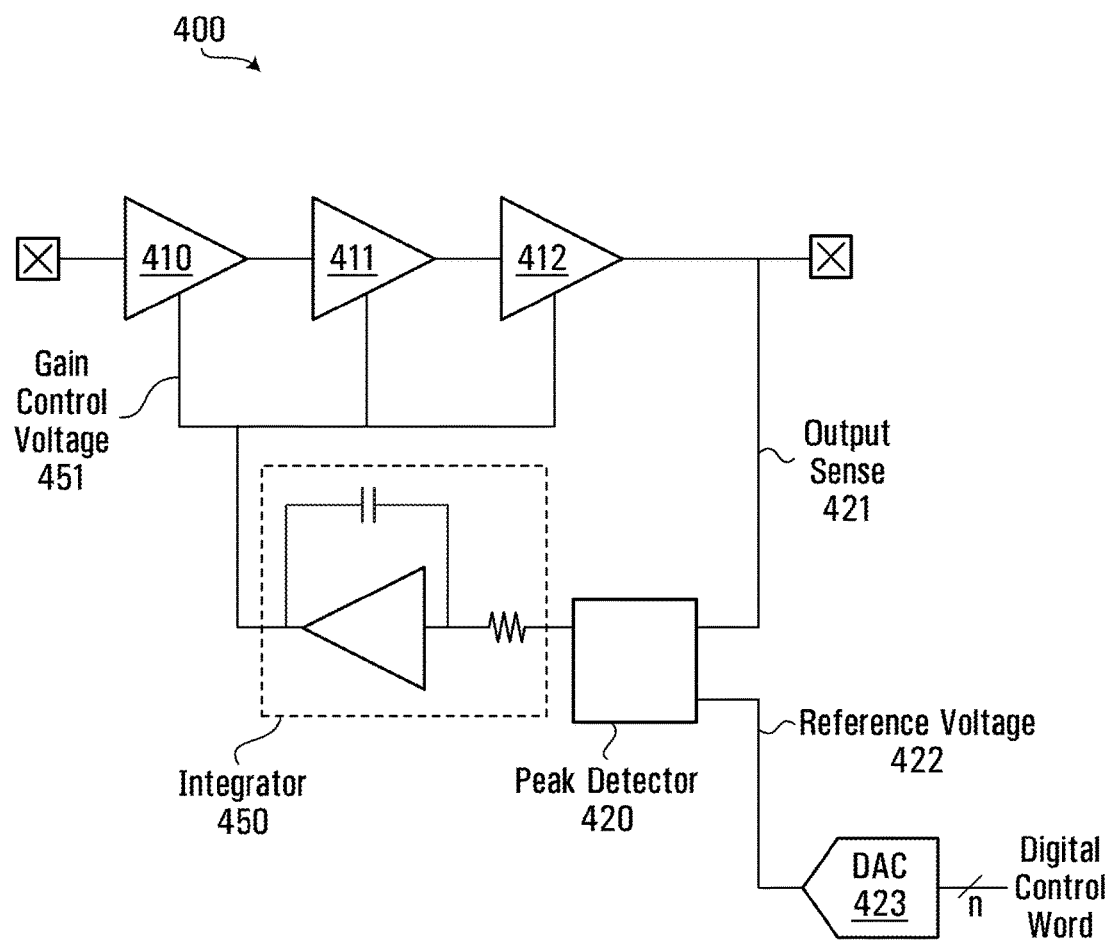
FIG. 4 is a block diagram of example TIA gain stages having digital amplitude control.

In some implementations, the target output voltage of the TIA 130 and/or the gain of the TIA 130 is/are adjusted digitally. In some implementations, this is accomplished by adjusting one or more TIA gain stages of the TIA 130. With reference to FIG. 4, shown is a block diagram of example TIA gain stages 400 having digital amplitude control. In some implementations, the TIA gain stages 400 are present in the amplifier 131 and are digitally adjusted via the equalisation feedback 151 from the feedback processor 150. Details of the TIA gain stages 400 are provided below.

According to FIG. 4, the TIA gain stages 400 include three gain stages: a first gain stage 410, a second gain stage 411, and a final gain stage 412. However, the number of gain stages is implementation-specific. A peak detector 420 compares an output sense 421 from the final gain stage 412 against a reference voltage 422, which is generated by a DAC 423 according to a digital control word from the equalisation feedback 151. Differences between the output sense 421 and the reference voltage 422 are accumulated by an integrator 450 thereby producing a gain control voltage 451 used to control gain of the first gain stage 410, the second gain stage 411, and the final gain stage 412.

Other mechanisms for adjusting the target output voltage of the TIA 130 and/or the gain of the TIA 130 are possible and are within the scope of this disclosure. For example, although the output sense 421 is shown from the final gain stage 412, in other implementations, output is sensed before the final gain stage 412 to avoid issues that could be caused by output matching. Other implementations are possible.

Adjusting Power Consumption

In optical systems, power consumption and performance of a TIA may be key to the overall performance of the optical system. This is particularly true of optical modules such as QSFP28 where a power envelope may be fixed due to the ability of the host system to dissipate the associated heat. As noted above, achieving very low power has become a primary requirement for many applications including data-centers, where dealing with heat generated by optical systems is a costly problem. Embodiments of the disclosure can tune the power consumption of the TIA as appropriate.

In some implementations, the feedback processor 150 is configured for adjusting at least one of the parameters to change a power consumption of the TIA. In some implementations, to accomplish this adjustment, the feedback processor 150 adjusts the power supply voltage $V_{CC}$ for the amplifier 131 of the TIA 130. For example, the power supply voltage $V_{CC}$ can be adjusted to a level that is low but still sufficiently high enough to robustly receive and recover data from the TIA 130. Alternatively, or additionally, the feedback processor 150 adjusts a bias current for the TIA 130. This adjustment can be made based on any one or more of the equalization metrics listed above.

In some implementations, the power supply voltage $V_{CC}$ is generated by a programmable external regulator that can be adjusted via the equalisation feedback 151 from the feedback processor 150. In particular, the power supply voltage $V_{CC}$ can be increased or decreased according to the equalisation feedback 151. In some implementations, the power supply voltage $V_{CC}$ is reduced when such reduction can be done without hampering performance. In this manner, power consumption can be reduced when channel conditions are favourable.

Figure 5A:
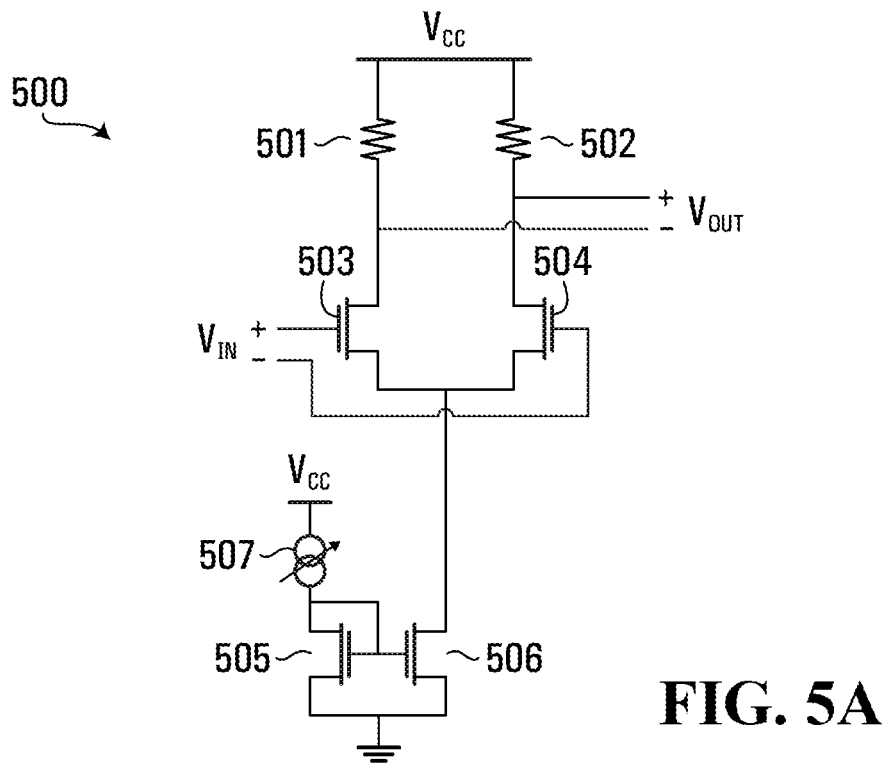
FIG. 5A is a circuit diagram of an amplifier having a current mirror with a variable bias current supply.
Figure 5B:
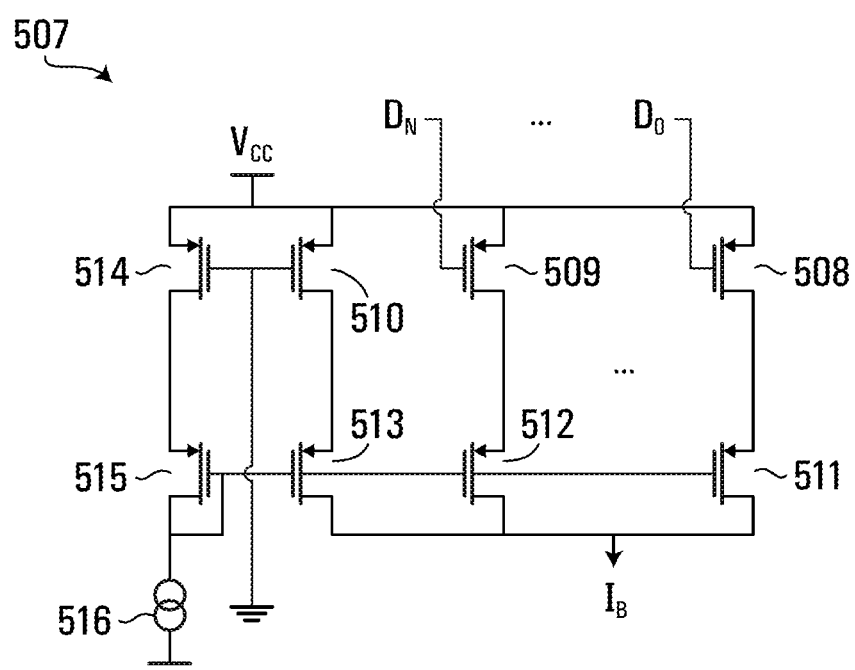
FIG. 5B is a circuit diagram of the variable bias current supply.

It is to be understood that adjusting the power supply voltage $V_{CC}$ of the TIA 130 is only one of many possible ways to adjust power consumption of the TIA 130. In some implementations, the amplifier 131 of the TIA 130 includes components that can be adjusted to adjust the power consumption of the TIA 130. For example, in some implementations, the amplifier 131 includes a bias current supply that can be adjusted. FIG. 5A is a circuit diagram of an amplifier 500 having a current mirror with a variable bias current supply 507, and FIG. 5B is a circuit diagram of the variable bias current supply 507. In some implementations, the amplifier 500 is present in the amplifier 131 and its variable bias current supply 507 is digitally adjusted via the equalisation feedback 151 from the feedback processor 150. Details of the amplifier 500 are provided below.

According to FIG. 5A, the amplifier 500 has bias resistors 501,502 and a pair of transistors 503,504 in a differential configuration with an input voltage $V_{in}$ driving gates of the transistors 503,504 and an output voltage $V_{out}$ stemming from drains of the transistors 503,504. The amplifier 500 also has a pair of transistors 505,506 that are configured as a current mirror. The current mirror has a variable bias current supply 507, which can be digitally adjusted via the equalisation feedback 151 from the feedback processor 150.

According to FIG. 5B, the variable bias current supply 507 is a current mirror that includes parallel paths for current to flow from the power supply voltage $V_{CC}$ to form the bias current $I_B$. The parallel paths include a first parallel path with transistors 508,511, a second parallel path with transistors 509,512, and a third parallel path with transistors 510,513. There may be other parallel paths, but they are not shown. At least some of the parallel paths can be enabled or disabled by the transistors 508,509 according to digital signals $D_0, \ldots, D_N$ of the equalisation feedback 151. Some paths might always be enabled such as the path having the transistors 510,513. Transistors 514,515 are arranged in the current mirror such that the current through each of the parallel paths that have been enabled mirrors a fixed current from a current source 516, which drives the gates of the transistors 511, 512, 513, and 515. The bias current $I_B$ is a sum of the currents from all of the parallel paths that have been enabled. The parallel paths that have not been enabled do not contribute any current to the bias current $I_B$.

Adjusting THD

In some implementations, the feedback processor 150 is configured for adjusting at least one of the parameters of the TIA 130 to change a THD of the voltage signal $S_V$. In some implementations, this adjustment is made based on an SNR of the processed signal $S_P$ and/or a BER of the processed signal $S_P$, although other equalization metrics are possible.

In some implementations, to accomplish this adjustment, the feedback processor 150 adjusts a power supply voltage supplied to the TIA and/or a bias current for the TIA. Details of how the feedback processor 150 can adjust a power supply voltage supplied to the TIA and/or a bias current for the TIA have been provided above and are not repeated here.

Alternatively, or additionally, to accomplish this adjustment, the feedback processor 150 adjusts a target output voltage of the TIA 130 and/or a gain of the TIA 130. Details of how the feedback processor 150 can adjust a target output voltage of the TIA 130 and/or a gain of the TIA 130 have been provided above and are not repeated here.

Example Method

Figure 6:
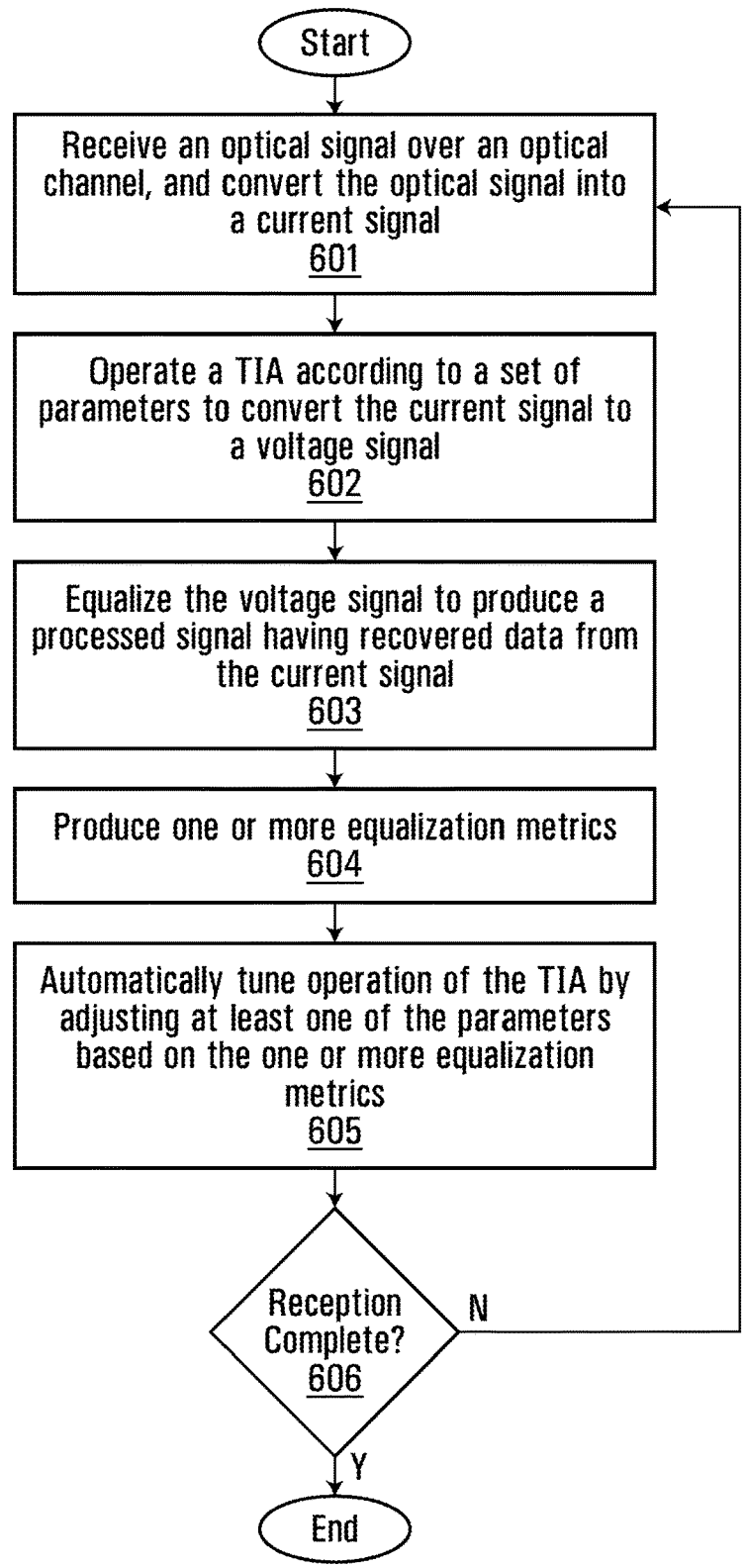
FIG. 6 is a flowchart of an example method for recovering data.

Referring now to FIG. 6, shown is a flowchart of an example method for recovering data. This method may be implemented by an optical receiver that recovers data, for example the optical receiver 110 shown in FIG. 1. More generally, this method may be implemented by any appropriately configured optical receiver having a TIA and an equalizer for recovering data.

At step 601, the optical receiver receives an optical signal over an optical channel, and converts the optical signal into a current signal.

At step 602, the optical receiver operates the TIA according to a set of parameters to convert the current signal to a voltage signal. There are many possibilities for the parameters. Example parameters have been described earlier and are not repeated here.

At step 603, the optical receiver equalizes the voltage signal to produce a processed signal having recovered data from the optical signal. The optical channel is not ideal in the sense that it introduces some amount of noise and/or distortion as a function of many factors. As described above, the recovery of data can be affected by such factors.

At step 604, the optical receiver produces one or more equalization metrics, which are indicative of performance of the equalization or difficulty in recovering data. There are many possibilities for the equalization metric(s). Example equalization metrics have been described earlier and are not repeated here.

At step 605, the optical receiver automatically tunes operation of the TIA by adjusting at least one of the parameters based on the one or more equalization metrics. The operation of the TIA is changed upon the parameters being changed, thereby affecting performance or power consumption of the optical receiver.

If at step 606 the reception and recovery of data is complete, then the method concludes. However, if at step 606 the reception is not complete, then the method loops back to step 601. In some implementations, all of steps 601 to 605 are repeated. In this manner, it is possible to effect changes in performance or power consumption of the optical receiver continuously in real-time while receiving and recovering data. During this process, one or more equalization metrics can change, and performance or power consumption of the optical receiver can be adjusted accordingly even if the effects of the optical channel are not changing. In some implementations, an equalization metric is monitored and the TIA is tuned at step 605 only when the equalization metric has changed by a predefined amount. In alternative implementations, step 605 is not repeated.

There are many possibilities for automatically tuning operation of the TIA. In some implementations, automatically tuning operation of the TIA involves adjusting a frequency response of the TIA, an amplitude of the processed signal, a power consumption of the TIA, and/or a THD of the processed signal. Example details have been described earlier and are not repeated here.

In some implementations, upon start-up, the optical receiver sweeps all settings to get a preferred value out of one or more of the equalization metrics described earlier. A search algorithm (e.g. LMS algorithm or gradient-based algorithm) can be used to try to push a solution to a minimum or a maximum. In some implementations, one or more equalization metrics are used continuously with an integrator to create a feedback loop that settles to a desired value. In this manner, smaller steps can be taken to avoid burst errors.

Numerous modifications and variations of the present disclosure are possible in light of the above teachings. It is therefore to be understood that within the scope of the appended claims, the disclosure may be practised otherwise than as specifically described herein.

We claim:

1. An optical receiver, comprising:
a photodetector configured to receive an optical signal over an optical channel and to convert the optical signal into a current signal;
a TIA (Transimpedance Amplifier) configured to operate according to a set of parameters to convert the current signal to a voltage signal;
an equalizer configured to process the voltage signal to produce a processed signal having recovered data from the optical signal, and to produce at least one equalization metric; and
a feedback processor configured to automatically tune operation of the TIA by adjusting at least one of the parameters based on the at least one equalization metric to change the power consumption of the TIA, the at least one parameter comprising a power supply voltage supplied to the TIA.

2. The optical receiver of claim 1, wherein the feedback processor is configured to automatically tune operation of the TIA continuously in real-time to effect changes in performance or power consumption of the optical receiver while recovering data.

3. The optical receiver of claim 2, comprising:
a DSP (Digital Signal Processor) implementing at least the equalizer and the feedback processor;
wherein the feedback processor implements a search algorithm to determine how to adjust at least one of the parameters continuously in real-time to effect the changes in performance or power consumption of the optical receiver while recovering data.

4. The optical receiver of claim 1, wherein the at least one equalization metric comprises one or more of an SNR (Signal to Noise Ratio) of the processed signal, an indication of equalization strength for the equalizer to recover data, an indication of tail strength of the processed signal, data framing information, DC-balance disparity information, a BER (Bit Error Rate) of the processed signal, residual ISI (Intersymbol Interference) of the voltage signal, or a THD (Total Harmonic Distortion) of the processed signal.

5. The optical receiver of claim 1, wherein the feedback processor is further configured for adjusting at least one of the parameters to change a frequency response of the TIA.

6. The optical receiver of claim 5, wherein the at least one parameter that is adjusted to change a frequency response of the TIA comprises impedance of an internal feedback circuit of the TIA.

7. The optical receiver of claim 5, wherein the at least one parameter that is adjusted to change a frequency response of the TIA comprises impedance of an active or passive load of the TIA.

8. The optical receiver of claim 1, wherein the feedback processor is further configured for adjusting at least one of the parameters to change an amplitude of the processed signal.

9. The optical receiver of claim 8, wherein the at least one parameter that is adjusted to change an amplitude of the processed signal comprises a target output voltage of the TIA and/or a gain of the TIA.

10. The optical receiver of claim 1, wherein the at least one parameter that is adjusted further comprises a bias current for the TIA.

11. The optical receiver of claim 1, wherein the feedback processor is further configured for adjusting at least one of the parameters to change a THD (Total Harmonic Distortion) of the processed signal.

12. The optical receiver of claim 11, wherein the at least one parameter that is adjusted to change a THD of the processed signal comprises a power supply voltage supplied to the TIA.

13. The optical receiver of claim 11, wherein the at least one parameter that is adjusted to change a THD of the processed signal comprises a bias current for the TIA.

14. The optical receiver of claim 11, wherein the at least one parameter that is adjusted to change a THD of the processed signal comprises a target output voltage of the TIA and/or a gain of the TIA.

* * * * *